(12) United States Patent
Bourne

(10) Patent No.: US 8,171,071 B2
(45) Date of Patent: May 1, 2012

(54) OPEN COMPONENT MANIPULATION SYSTEM

(75) Inventor: Geoffrey D. Bourne, Allen, TX (US)

(73) Assignee: Tektronix, Inc., Beaverton, OR (US)

( * ) Notice: Subject to any disclaimer, the term of this patent is extended or adjusted under 35 U.S.C. 154(b) by 1105 days.

(21) Appl. No.: 11/416,714

(22) Filed: May 3, 2006

(65) Prior Publication Data

US 2007/0258467 A1    Nov. 8, 2007

(51) Int. Cl.
*G06F 13/00* (2006.01)
*H04L 12/56* (2006.01)
(52) U.S. Cl. .................... 709/201; 709/218; 370/408
(58) Field of Classification Search .................. 370/400; 709/201–203
See application file for complete search history.

(56) References Cited

U.S. PATENT DOCUMENTS

| | | | | |
|---|---|---|---|---|
| 5,895,485 | A * | 4/1999 | Loechel et al. | 711/119 |
| 6,766,362 | B1 * | 7/2004 | Miyasaka et al. | 709/219 |
| 7,257,772 | B1 * | 8/2007 | Jones et al. | 715/234 |
| 7,568,148 | B1 * | 7/2009 | Bharat et al. | 715/200 |
| 7,623,534 | B1 * | 11/2009 | Ramakrishnan et al. | 370/408 |
| 2002/0059592 | A1 * | 5/2002 | Kiraly | 725/37 |
| 2004/0081203 | A1 * | 4/2004 | Sodder et al. | 370/469 |
| 2005/0021843 | A1 | 1/2005 | Duigenan et al. | |
| 2005/0232281 | A1 * | 10/2005 | Rosenzweig et al. | 370/400 |
| 2005/0262205 | A1 * | 11/2005 | Nikolov et al. | 709/206 |
| 2006/0155581 | A1 * | 7/2006 | Eisenberger et al. | 705/3 |
| 2007/0112575 | A1 * | 5/2007 | Savoor et al. | 705/1 |
| 2007/0140170 | A1 * | 6/2007 | Jagana et al. | 370/331 |

OTHER PUBLICATIONS

XML Path Language (XPath) Version 1.0, W3C, [online] [Retrieved on Jul. 31, 2006], Retrieved from http://www.w3.org/TR/xpath.
XML Pointer Language (XPointer) Version 1.0, W3C, [online] [Retrieved on Jul. 31, 2006], Retrieved from http://www.w3.org/TR/WD-xptr.
Baehni, S., Eugster, P., Guerraoui, R., "Data-Aware Multicast", Distributed Programming Laboratory, EPFL, Proceedings of the 2004 International Conference on Dependable Systems and Networks (DSN'04) © 2004 IEEE, 10 pp.
Wang, J., Jin, B., Li, J., Shao, D., "A Sematic-Aware Publish/Subscribe System With RDF Patterns", Proceedings of the 28th Annual International Computer Software and Applications Conference (COMPSAC'04) © 2004 IEEE, 6 pp.
Burcea, I., Jacobsen, H., de Lara, E., Muthusamy, V., Petrovic, M., Disconnected Operation in Publish/Subscribe Middleware, Proceedings of the 2004 IEEE International Conference On Mobile Data Management (MDM'04) © 2004 IEEE, 12 pp.
Pietzuch, P., Bacon, J., "Hermes: A Distributed Event-Based Middleware Architecture", Proceedings of the 22nd International Conference on Distributed Computing Systems Workshops (ICDCSW'02) © 2002 IEEE, 8 pp.

* cited by examiner

*Primary Examiner* — Ian N Moore
*Assistant Examiner* — Thai Nguyen
(74) *Attorney, Agent, or Firm* — Fulbright & Jaworski L.L.P.

(57) ABSTRACT

A messaging system and method for creating a messaging hierarchy in a computer network are described. The network is made up of multiple network entities, which include both publishing entities and subscribing entities, where the publishing entities have data of which the subscribing entities may have need. The messaging system and method for creating a messaging hierarchy also include a data hierarchy applied to the data exchanged between the publishing entities and subscribing entities. The data hierarchy determines the virtual connections formed between the network entities in response to publication and subscription requests exchanged between the entities, such that the virtual connections established between network entities form a hierarchy corresponding to the data hierarchy.

39 Claims, 6 Drawing Sheets

Communication path between three leaf entities

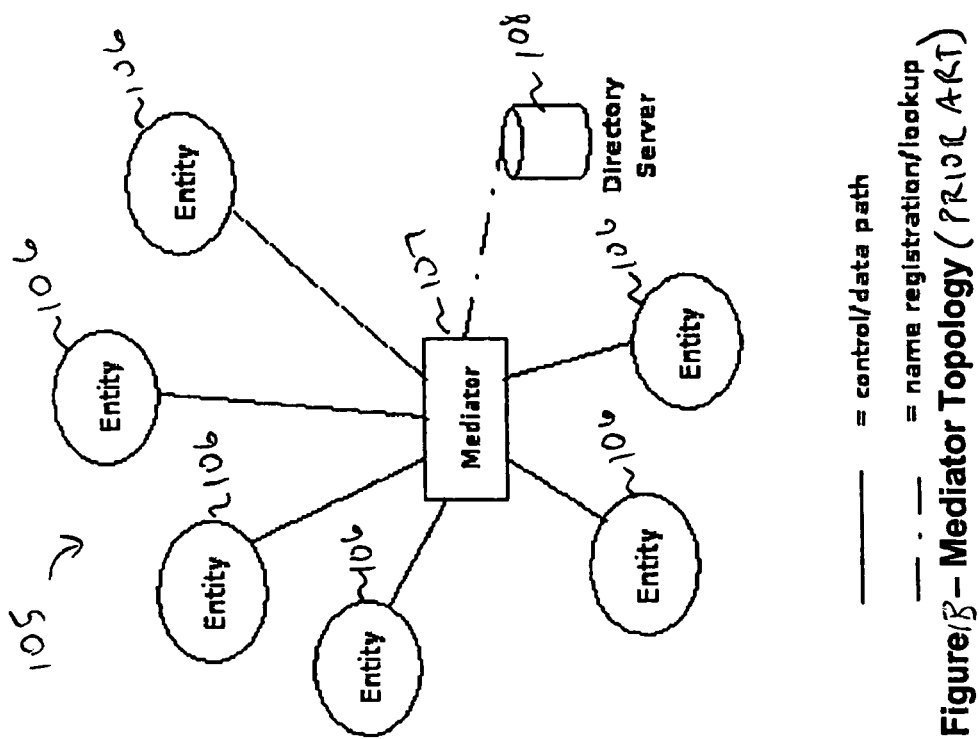
Figure 1B – Mediator Topology (PRIOR ART)
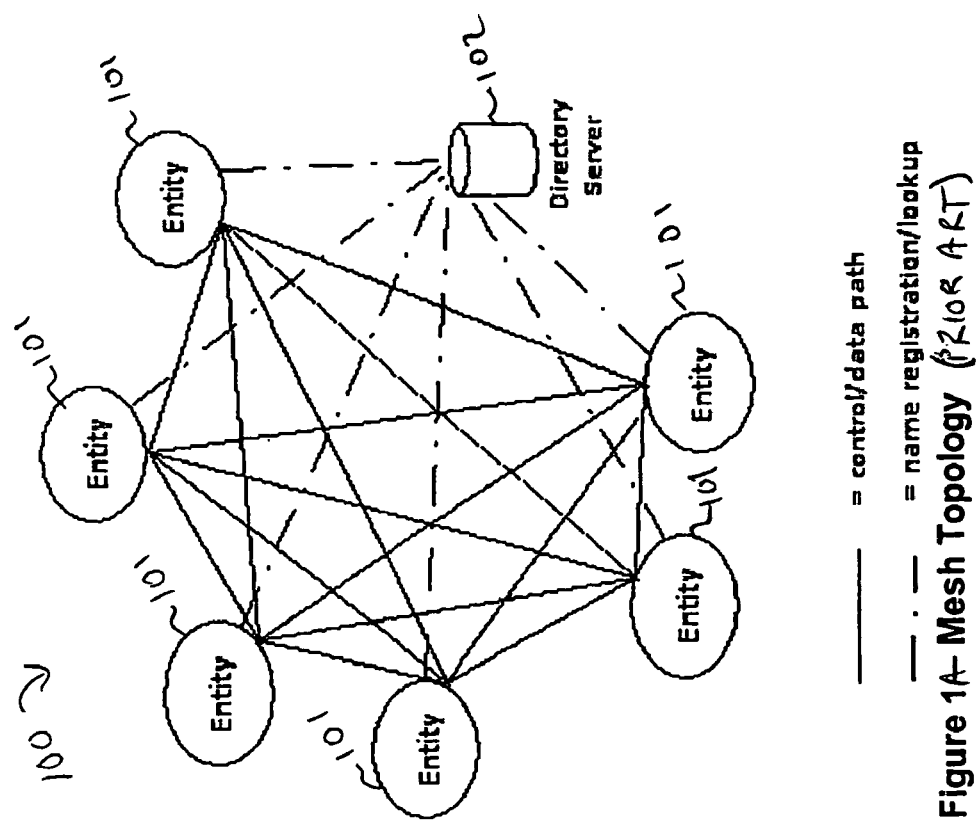
Figure 1A – Mesh Topology (PRIOR ART)

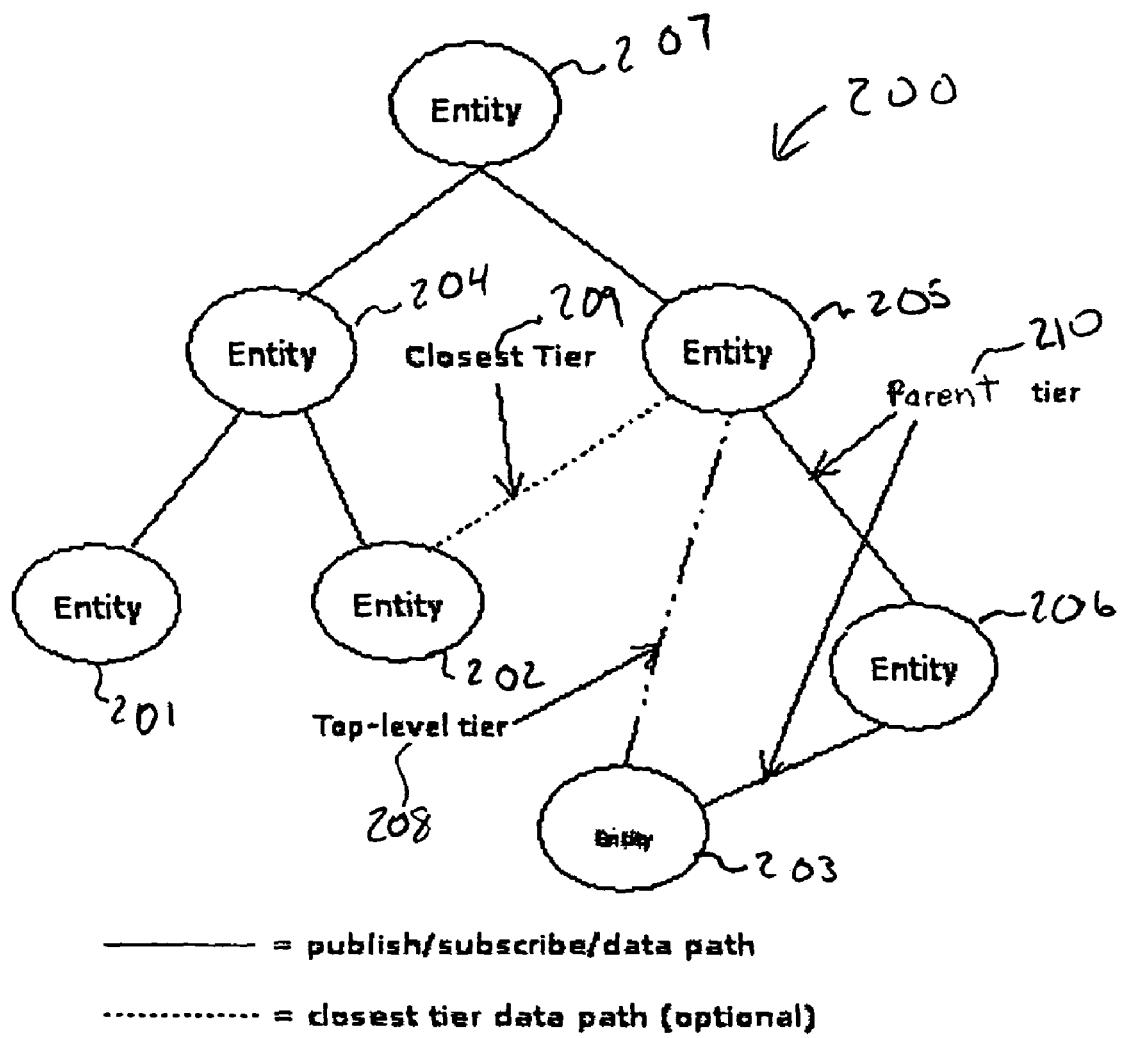
Figure 2 - Example Entity Relationships

```
<Root>
    <ThingsWithThreeLetters>
        <ABC>
            ...
        </ABC>
        <XYZ>
            ...
        </XYZ>
        ...
    </ThingsWithThreeLetters>
    <OtherThings>
        ...
    </OtherThings>
</Root>
```

FIGURE 3

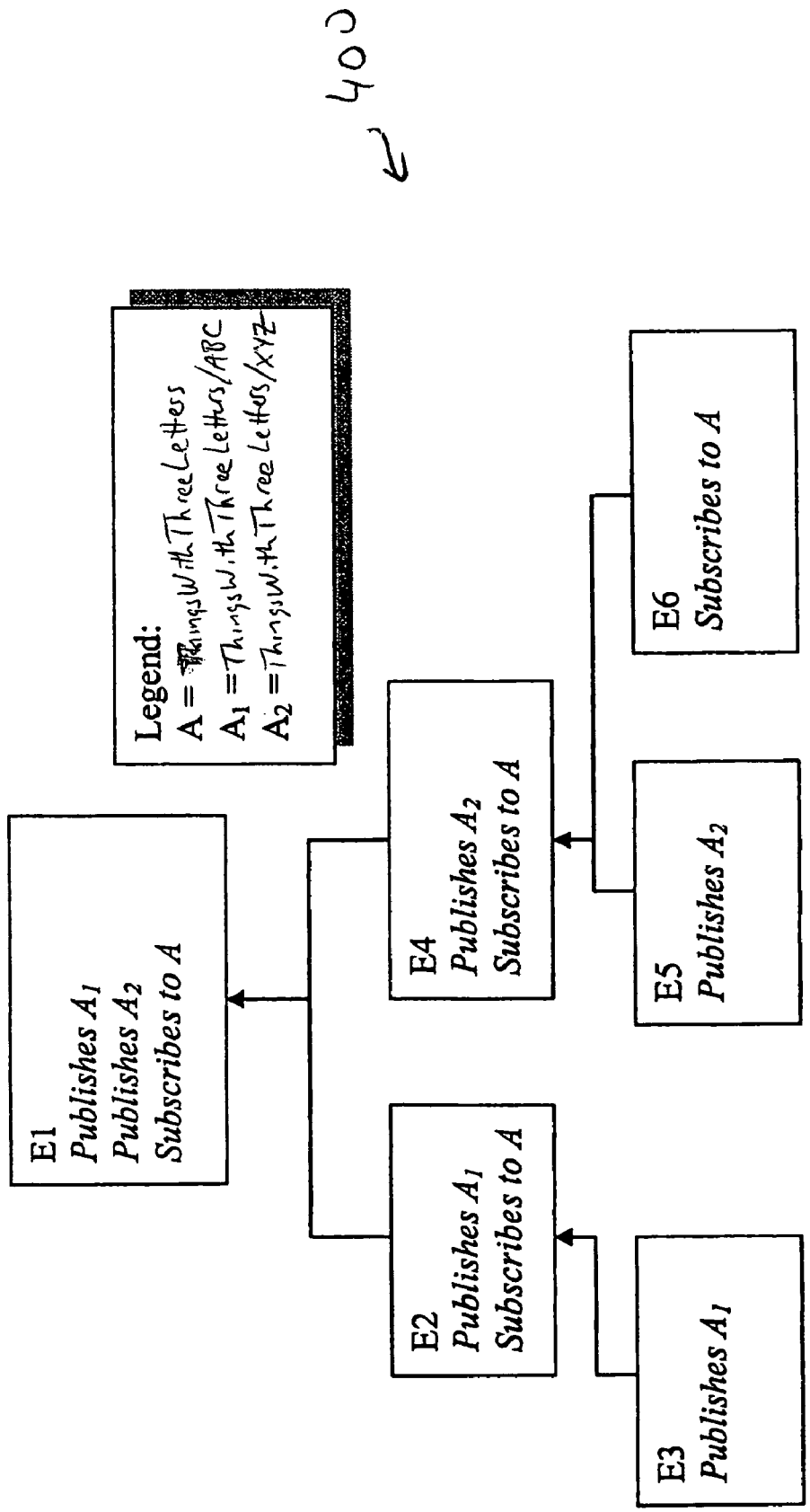
Figure 4 - Communication path between three leaf entities

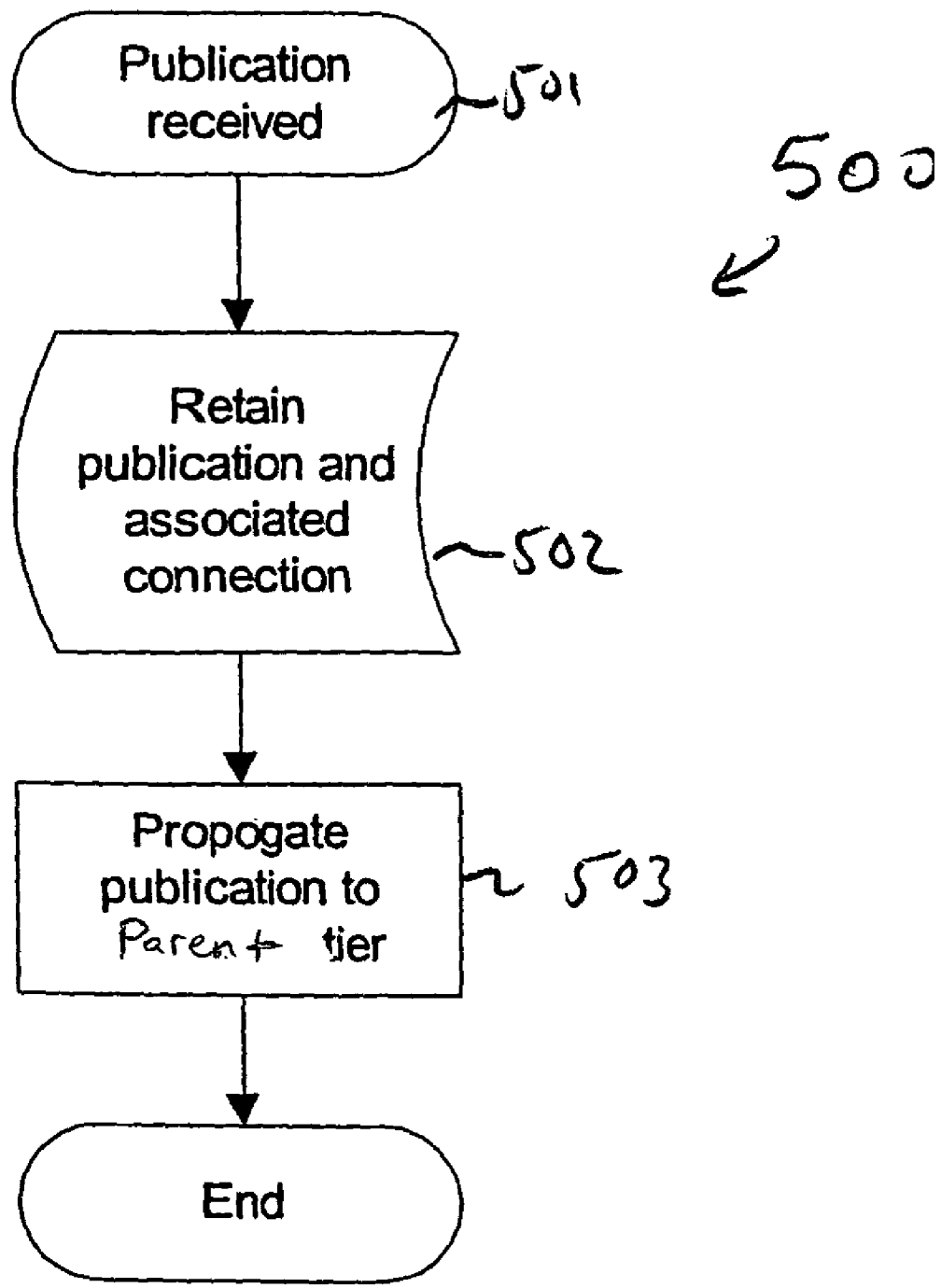
Figure 5 – Publication flow

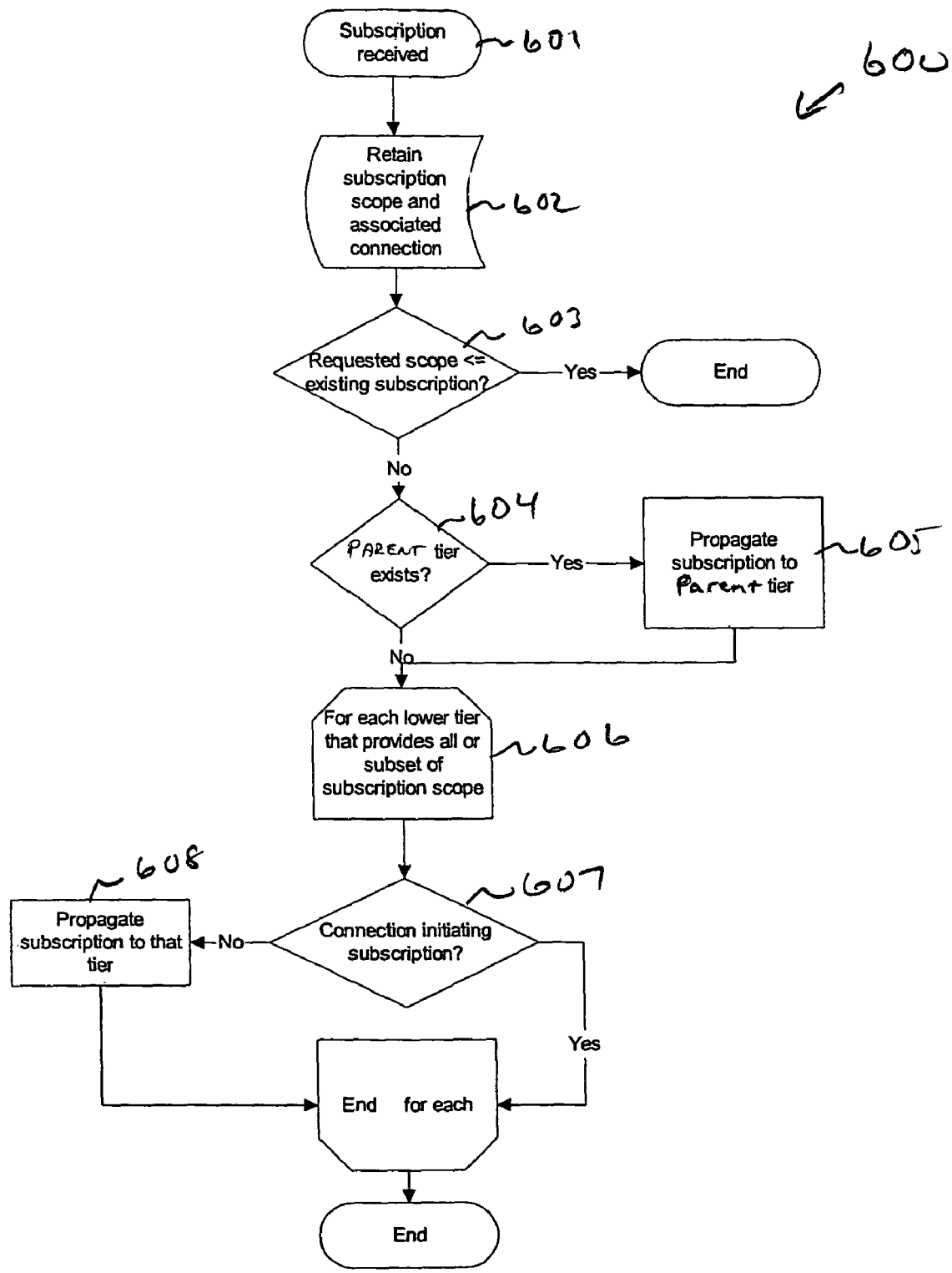
Figure 6 - Subscription flow

OPEN COMPONENT MANIPULATION SYSTEM

TECHNICAL FIELD

The concepts described herein relate to data and telecommunication networks, and more specifically to intercommunication between elements in a distributed communications system.

BACKGROUND OF THE INVENTION

Distributed computing systems spend a significant amount of time communicating data between various system entities, which may or may not be physically co-located. Traditionally, two different approaches have been utilized in exchanging information between system elements: point-to-point topologies and mediator topologies. FIG. 1A shows an example of a point-to-point network topology 100. Each of the entities 101 has a direct communication link with every other entity. A central directory server 102 is used to locate the desired end points prior to connection establishment. In many cases, physical point-to-point communication is not possible due to the number of elements in the network or due to interconnecting disparate network topologies that prevent point-to-point communication.

FIG. 1B shows an example of a mediator, or proxy, network topology 105, which is used where the various network elements 106 do not have direct physical access to each other. Instead all messaging flows, including directory activity, through server 107 with the assistance of central directory server 108.

Both of these types of network topologies require that the messaging that carries data be customized for the particular applications that process the data. This results in a very rigid system that does not allow the introduction of new elements or applications without potentially extensive re-engineering. Further, both systems require one or more central directory servers that are required to register the location and services of each network element. Other network elements must query the directory to find the desired element or service. If the directory servers are not available, the network becomes non-functional.

For geographically distributed systems, the intercommunication problems can be amplified. For example, for monitoring equipment in a communications network, some elements can be as close as physically on separate blades, but within the same network monitor, or probe. There can also be other elements of the systems that may be somewhere on a third party network, and could even be on the other side of the world. Each of these elements needs to intercommunicate with other network elements. Today's solutions, as illustrated in FIGS. 1A and 1B, are really just a mix match of industry standard network protocols with proprietary messaging on top of the protocol.

However, different sections of the network, or different elements within the network are likely to use different protocols and require a different set of messages. These realities make it very hard to extend current messaging systems to add new capability or to add new elements in the system that need to also receive those kinds of messages. As a result, most networks end up with hard coded messaging protocols between the applications designed to fit specific network implementations and equipment.

BRIEF SUMMARY OF THE INVENTION

The concepts set forth herein describe a messaging system for use in a network, where the messaging system includes a plurality of network entities. The plurality of network entities include both publishing entities and subscribing entities, where the publishing entities have data of which the subscribing entities have need. The messaging system also includes a data hierarchy applied to the data exchanged between the publishing entities and subscribing entities, wherein the data hierarchy determines the virtual connections formed between the plurality of network entities in response to publication and subscription requests exchanged between the entities, such that the virtual connections established between network entities form a hierarchy corresponding to the data hierarchy.

In another embodiment, a method for creating a messaging hierarchy among multiple network entities in a computer network is described, where the method includes locating a parent tier entity by a first entity in the network upon joining the network. The method also sends publication/subscription information for the first entity to the parent tier entity, and sends publication/subscription information from the parent tier entity to entities above the parent tier entity in the messaging hierarchy and to entities below the parent tier entity which subscribe to data corresponding to a publication entry in the parent tier entity's publication/subscription information. The messaging hierarchy of the method is formed by virtual connections between the network entities in response to the publication/subscription information exchanged between entities and corresponds to a data hierarchy defined for the messaging hierarchy.

In yet another embodiment, a method for performing subscription flow in a network entity is described, where the network entity is part of a messaging hierarchy in a computer network. The method includes receiving subscription information from another entity in the network, retaining the subscription information and associated connection information. The method further includes providing the subscription information to a parent tier when the network entity is determined to have a parent tier, and providing subscription information to each lower tier entity that provides data corresponding to the subscription information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 1A and B are network diagrams illustrating a mesh network topology and a mediator network topology, respectively;

FIG. 2 is a network diagram illustrating a hierarchical network in accordance with the concepts described herein;

FIG. 3 is an illustration of an embodiment of a data hierarchy according to the concepts described herein using a hierarchical language format;

FIG. 4 is an block diagram illustrating an example of a hierarchical network according to the concepts described herein;

FIG. 5 is a flow chart showing an embodiment of a publication flow for a network entity in a messaging system according to the concepts described herein; and FIG. 6 is a flow chart showing an embodiment of a subscription flow for a network entity in a messaging system according to the concepts described herein.

DETAILED DESCRIPTION OF THE INVENTION

In order to provide a more efficient and flexible mechanism for messaging between elements in a distributed network with disparate network protocols and network elements, the concepts described herein provide a robust hierarchical messaging scheme which can operate across geographically distributed networks without regard to specific network protocols or physical network topology. Further, the concepts described herein facilitate the registration and location of arbitrary data sources in an ad hoc and decentralized manner while allowing for flexible modifications to data sets in a way that parent network elements are completely unaffected by the modifications.

By virtue of the hierarchical nature of embodiments of the messing system as described herein, network elements and entities can be added and removed from the network freely with no impact on the messaging system or network operation. According to preferred embodiments of the messaging system, the architecture includes three types of system entities. They are publishers, subscribers and guests. Publishers are network entities that publish data that other elements in the network may need or use. Publisher components push updates, or new data, as requested via subscriptions or queries. Subscribers are network entities that request notification to receive updates of specific published information. These updates are received by the subscriber from a parent tier or a peer tier. Guest entities are entities that appear in the network for a short period of time and generally query or update a small amount of the data hierarchy. Entities are not limited to being only one type. An entity can both publish data to the network and subscribe to data from other entities within the network. The scope of the data published and subscribed in this case may, or may not, overlap. Further, each entity at a parent or top tier should have knowledge of all the publications and subscriptions of the entities below it.

The hierarchical nature of the system allows entities to enter and leave the system by simply notifying the collective network of their interest. For example, an entity can advertise to the network (via its parent) that it is interested in a particular section of the data hierarchy, and request that the network (via its parent) notify it when any of that data changes. Similarly, an entity can advertise to the network that it is publishing a particular section of the data hierarchy and request that entities interested in that data let it know. Eventually the publications and subscriptions will intersect in a tree-like hierarchy where the messaging system will determine that one entity is providing certain information and another entity in the hierarchy wants to consume that information.

While reference may be made to a communications network, or more specifically a network of entities monitoring a communications network, for the purpose of illustrating the messaging system of the present invention, the messaging system could be used in any type of network and still embody the concepts described herein. Further a messaging system according to the concepts described herein can be used within sub-networks and within a network comprised of multiple independent sub-networks. An example of a sub-network could be components within a network-monitoring probe, such as the Geo Probe from Tektronix, where the components of the probe communicate according to the messaging system of the present invention. Additionally, multiple probes and other components of a monitoring system can be interconnected by the messaging system described herein to allow each entity to share information within the network. The information shared could be configuration information sent to the devices, data collected by the devices that is used to monitor the network, aggregations of data or statistics compiled by entities within the network, control information for directing entities within the network, or any other data that could be useful to an individual entity in the network, or the network itself.

This combination of the data hierarchy and the network hierarchy together, according to the concepts described herein, facilitate the organization and operation of a network using the messaging system described herein. In other words, the position in the data hierarchy determines physically where in the network that information resides and needs to traverse.

The data hierarchy is preferably constructed using a hierarchical markup language which could be XML. As a hierarchical language, the data represented in XML can be formatted to correspond to the hierarchy of the network or sub-network, allowing the network to organize itself into a hierarchy corresponding to the data being sent through the messaging system described herein. Further, by using an open hierarchical language such as XML the messaging system becomes independent of the underlying network protocols and can cross networks that employ different protocols Referring now to FIG. 2, an embodiment of a hierarchical configuration 200 in accordance with the concepts described herein is shown. By its nature a hierarchical structure means that those entities at the bottom of the structure will know very little other than their own function and the location of the entities in the network closest to them, which is typically limited to the parent entity. Entities 201, 202 and 203 are at the bottom of the hierarchy and are aware of their own connections to the devices near them in the network. Entities higher in the network, such as entities 204, 205 and 206, both have entities lower in the network reporting their published data subscriptions to them, and have entities above them in the network to which they report their published data and subscriptions. The mechanisms to locate a parent tier can make use of information provided by higher tier entities and information provided by the application about the subset of data that the entity utilizes. This results in the hierarchical structure of the entity connections loosely following the hierarchy of the data itself.

Higher in the hierarchy are entities, such as entity 207, with well-known addresses that any tiers joining the system below it can easily locate. While entity 207 is shown as the highest entity in the example of FIG. 2, entities 204 and 205 can also be considered as the highest point in the hierarchy for their particular sub-networks. In preferred embodiments, connections to higher level tiers, such as top-tier connection 208, are temporarily used by lower entities to find parent tier connections or even closest-tier connections, such as parent-tier connection 210, or closest-tier connection 209. As shown by top-tier connection 208, a top-level tier connection may not be a literal connection to the top of the hierarchy, but may be a connection to a top level of a sub-network which is the communication path to the larger network. The top-tier and parent-tier labels refer to the relationships between entities and not to the entities themselves. A particular entity may be the top-tier for a sub-network of other entities, but may also have a top-tier connection of its own to another entity higher in the network. The same relationships are true for parent-tier connections and closest-tier connections.

In order to minimize latency and extraneous transfer of data through the system, preferred embodiments of the subscribe/publish process will perform path optimization to locate and establish channels, or virtual channels, with the closest tier for the transfer of updates and query requests/responses. Depending on network topology and physical access, there may not always exist a direct connection between a given publisher of data and a subscriber for that data. The determination of closest tier connections, which will be described in greater detail below, is not trivial when there are multiple publishers or subscribers for overlapping segments of the hierarchy. Where this is true, the hierarchy needs to be able to arrange itself such that a common routing point is located within the path of the closest tier channel.

The path optimization described above should only apply to the update and query operations used to transfer data through the network. Path establishment operations themselves (subscribe, publish, unsubscribe, unpublished operations) should follow the full hierarchical paths to ensure that the hierarchy is fully aware.

As is implied by trying to use closest tier connections, there may be significant portions of the overall data hierarchy that have relevance to a limited subset of entities within the hierarchy. For example, if a messaging system according to the concepts described herein were used in a communications network, and specifically used within a monitoring network used to monitor the communications network, data related to a probe within the network may not have any relevance to entities outside of the probe, but various aspects of the data may be used by different entities within the probe itself.

An example of this data locality is illustrated in the data hierarchy shown in FIG. 3. FIG. 3 shows an example of a data hierarchy with root definitions that limit the application of the data hierarchy to a specific portion of the network, namely ThingsWithThreeLetters, as is set out by the Root definitions within the data hierarchy. To avoid burdening external entities with this information, each entity can define a locality for the data information. Data within the ThingsWiththreeLetters sub-network will be able to utilize the relevant information while things outside the sub-network will not be burdened by the operations and data that have no relevance outside the sub-network. In the example data hierarchy of FIG. 3, the messaging system can allow the information to be blocked at the root level shown, which, for example, could be the structure of the network-monitoring probe, thereby preventing the information from exiting the probe and in turn passing up into the hierarchy of the network external to the probe. This allows the system to contain information to the subset of the network where the data would have relevance. Similarly, data relevant only to one portion of the network could be blocked from entering into sub-networks that do not have use for the information.

In addition to defining data locality in order to prevent unnecessary information flow, entities or data can be designated with a level of persistence to prevent old or state data from circulating within the network or residing at entities consuming resources. Preferred embodiments of a messaging system according to the concepts described herein can have three levels of data persistence. Entities may be designated with full persistence. Full persistence capabilities will typically save all subscribed information of the hierarchy, both direct and indirect subscriptions, to a non-volatile storage medium, such as a disk.

Entities may also be designated with cache type persistence. These entities will provide a proxy type mechanism that is used to cache subscribed portions of the hierarchy and provide results to queries related to the cached information that they receive. Entities with full persistence for some information may also act as caches for other data. Entities with no persistence merely act as a pass-through to transport information within the hierarchy.

Referring now to FIG. 4, an example of a messaging hierarchy using a data hierarchy and network hierarchy is shown in accordance with the concepts described herein is shown. Specifically, FIG. 4 illustrates an example of the operation of the messaging system where information contained in a data hierarchy, such as illustrated by A, A1 and A2 is used to form a network hierarchy of devices which seek to subscribe or publish data in the data hierarchy. In the example of FIG. 4, network 400 contains entity E6 which needs to be provided with updates to a component starting at A where A is actually notation in the data hierarchy. 'A' represents an XML string in the hierarchy of data Root/ThingsWithThreeLetters. Entities E3 and E5 publish data A1 and A2, respectively. A1 represents data Root/ThingsWithThreeLetters/ABC while A2 represents data Root/ThingsWithThreeLetters/XYZ.

To create a network hierarchy that allows entity E6 to receive the required data from entities E3 and E5, paths must be formed in the network between the respective devices. To illustrate how these types of interconnections can be formed using the messaging system described herein, reference will be made to entities of FIG. 4 and an illustrative example of the timeline which could result in the connections shown in FIG. 4. Though a particular sequence is described any of these events could happen in any order and result in a hierarchy within the scope of the concepts described herein.

Entity E1 is the first entity to join network 400. Since entity E1 is first in the example, there are no connections or relationships in existence. Next, entity E4 enters the system. Entity E4 joins the system with the knowledge that it needs to locate entity E1 as its parent tier. Entity E5 then enters the system also knowing to look for entity E1 as its top tier. After entity E5 locates entity E1 as its top tier it is given the location of entity E4 as its parent tier and tears down its connection to entity E1. Entity E5 then notifies entity E4 that it publishes data A2, at which point E4 then notifies entity E1, the next entity up in its hierarchy, that it publishes data A2.

Next, entity E6 joins the network and locates entity E4 as its parent/top tier and notifies entity E4 that it needs to subscribe to content A. Entity E4 then requests a subscription from entities E1 and E5 for content A. E5 is notified since E4 is aware that it publishes portions of A, namely A2. Upon receiving the initial subscription request, entity E5 transmits the current state of the data A2 to entity E6. Entity E2 then joins and locates entity E1 as its parent tier, and entity E3 joins and ultimately locates entity E2 as its parent tier. Entity E3 then notifies entity E2 that it publishes content A1 and entity E2 passes this publication information up the hierarchy to entity E1. Since entity E1 subscribes to A as a result of entity E6's subscription, entity E1 requests a subscription from entity E2 which then passes the subscription request to entity E3. Upon receiving the subscription request, entity E3 transmits its current content A1, which is passed up through entities E2 and E1 and then down to entity E6 through entity E4.

Once the current hierarchy shown in FIG. 4 is in place, updates to A, which includes A1 and A2, proceed naturally. For example, if entity E3 needs to modify or modifies content A1, entity E3 notifies entity E2 because of entity E2's subscription, which notifies entity E1 because of its subscription. Entity E1 then notifies entity E4 which then notifies entity E6. Similarly, when entity E5 modifies content A2, entity E5 notifies entity E4, which then notifies entities E1 and E6. It can easily be seen that in this way, because of the publication/subscription status at each device entity E6 will receive all content A when originally published or when updated.

With regard to entities establishing connections to the parent or closest ties, the entity should have a physical connection to the parent/closest tier device. The entity would either need to know, or be given enough information to know the TCP port and IP address to contact the device. Part of the process of establishing the specific connections may involve entities that are contacted by other entities in the hierarchy providing an address and port for an alternate device and telling the contacting device to use the new entity as its parent or possibly closest tier. This is shown in the example of FIG. 4 when entity E5 initially contacts entity E1, but is told by entity E1 to use entity E4 as its parent tier. The connection to E1 was terminated and entity E5 contacted and established a connection with entity E4.

It can be seen from examining the example hierarchy of FIG. 4 that each entity in the hierarchy knows the publication and subscription status for each entity below it. Entity E1, as the root entity in the example network, maintains all subscription and publication information for each entity in the network. The setup operations described will typically be an infrequent operation, while sending updated content will be a much more frequent operation.

Queries follow the same path as a new subscription, that is up the hierarchy and then back down to the publishing entity, or the first entity in the path that may be caching the desired information. Unlike subscriptions, however, queries are one-shot events which do not persist in the hierarchy in the same manner as the subscription requests.

It can be seen from the operation described with respect to FIG. 4 that each entity in the system is equally capable of routing the content, or data hierarchy, independent of the underlying application which produced or uses the content. Each entity, therefore, is capable of propagating or terminating "path establishments" based on a deterministic routing algorithm. Each entity maintains a table specifying communication paths which is organized in the same manner as the data hierarchy itself. Each node in the hierarchy, or tree, can optionally specify that one or more connections publish data for that node, and the entities underneath that node, or subscribes to data for that node, and entities underneath that node.

Since the lifetime of any entity in the system may be dynamic, the collective routing within the system must support unsubscribing and unpublishing. These operations are used to counteract any previous publish or subscribe operations to which they correspond. The unpublished and unsubscribe operations should have identical parameters to the publish and subscribe operations to which they correspond to prevent errors in the routing mechanisms. The communications paths follow the same paths as the corresponding publish and subscribe operations.

The data hierarchies described herein can exist at any level in the network. FIG. 4 was described with reference to a high level content hierarchy, however there can be hierarchies for configuration information, and even link configuration information which needs to be transmitted or conveyed. For example, a probe in the monitoring network may need to be configured and instructed to physically monitor a particular wire and particular time slots on the wire. Elsewhere in the configuration there could be unrelated information that defines a subscriber configuration. With the data hierarchy as described herein, the data itself can be also organized independent of the individual devices and location of the devices. This organization of the data into the data hierarchy, combines with the network hierarchy to provide the routing and the protocol. Therefore, regardless of the timeline, a first entity can come up before or after a second entity and simply advertise that it wants to subscribe to link information. Through the hierarchy of the physical network, and also looking at the hierarchy or the data itself, these entities will convey this particular information across in the direction of the requesting entity. The nature of the physical transmission between the two entities is unimportant as far as these entities are concerned.

Referring now to FIG. 5, a flow chart showing a preferred embodiment of a publication flow for each entity is described. Publication flow 500 begins when the publication information is received, process 501, either by an entity entering the hierarchy, a new publication being added to an existing entity, or by an entity in the hierarchy receiving publication information from another entity in the hierarchy. Process 502 shows the publication information being retained and associated with the connection from which it was received, as appropriate. Process 503 then propagates the publication information to its parent tier at which point publication flow 500 ends. Publication flow 500 is repeated by each entity in the hierarchy as the publication information propagates through the network.

Referring now to FIG. 6, a flow chart showing a preferred embodiment of a subscription flow for each entity is described. Subscription flow 600 begins at process 601 when subscription information is received by the entity. In process 602, the subscription scope is retained along with its associated connection. Process 603 determines if the requested scope is less than an existing subscription. If so, the process ends. If the requested scope is not less than an existing subscription the process passes to process 604 which determines if a parent tier exists higher in the hierarchy. If so, the process passes to process 605 which propagates the subscription to the parent tier. After propagating the subscription to the parent tier in process 605, or if process 604 determines that there is not a parent tier, the flow passes to process 606 where the flow determines each lower tier that provides all or a subset of the subscription scope. The flow then passes to process 607 which determines if the connection is the connection initiating a subscription. If not the subscription is propagated to that tier in process 608 after which the subscription flow ends. If process 607 determines that the connection is the connection initiating the subscription the flow ends.

One of the goals for this messaging system is that each entity should know as little as possible about the network in order to function. Therefore, when an entity comes online, the only thing that entity needs to know is that it needs to contact a parent tier entity and tell the parent tier entity any subscribe or publish information for the entity. The fact that there are other entities above the parent tier entity in the hierarchy is irrelevant to the joining entity. However, since the data that the entity may publish or subscribe to could be megabits of data, it would be very inefficient to send large amounts of data all the way up through the hierarchy to the root and then down again. To avoid this potential entities can also determine a closest tier in addition to its parent tier.

Any particular publish and subscriber pair of entities could be arranged such that physically they have no network access to each other. For example the publish entity could be a blade deeply embedded on one probe in the monitoring network and the subscribe entity could be a blade deeply embedded in a different part of the network. The entities ultimately have a path to communicate with the larger network, but there is not a direct point to point path. There may however be a path between two entities very close to the publish/subscribe entities which has far fewer hops than a path through the entire hierarchy. For example, using the network of FIG. 4, instead of sending data on the path E3 to E2 to E1 to E4 and then to E6, the network has the ability to see that E2 and E4 have a direct communication path between them. In that case a closest tier path can be established between E2 and E4 for the purpose of passing data between E3 and E6. In a larger network than that shown in FIG. 4 such closest tier connections can eliminate a great deal of network traffic. The closest tier connections apply only to the passing of data or content and do not apply to subscribe, publish or query operations. In other words, control information needs to use the hierarchy; while the data information can choose the best path which can be a closest-tier connection.

In the messaging system and network described herein, communication between entities is preferably performed over a streaming protocol using a hierarchical representation of data as the messaging format. TCP/IP can be used as the protocol in most cases, however, other transport mechanisms can be used if TCP/IP connectivity is unavailable. The transport mechanism chosen should be mutually supported by the top and parent tiers and be able to carry textual data. While any hierarchical representation of data can be used, XML is the preferred format as a majority of communication involves transporting arbitrary portions of the component hierarchy and easily allows for the structure of those portions to be changed. Both the information that makes up the component hierarchy and the messages themselves are preferably formatted in XML.

The communication between entities may preferably use SOAP (Simple Object Access Protocol), which is a protocol that enables XML on top of HTTP. SOAP can serve as the point to point protocol between any two entities. It is a universal protocol that is protocol neutral, allowing it to run on top of TCP, other open transport protocols, or even proprietary transports.

As entities enter the system they may optionally bind a TCP/IP socket for accepting connections, or use comparable binding mechanisms for other transport protocols. Entities at the top-level tier should bind their sockets at a well-known address and port. This allows lower layers to discover their parent or closest tier by first communicating with an upper level tier, query for a more appropriate tier, and then re-establish as connection with that tier's bound address.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A messaging system for use in a network, the messaging system comprising:
   a plurality of network entities which include both publishing entities and subscribing entities, the publishing entities publishing content of which the subscribing entities have need, wherein information embedded within the published content defines a data hierarchy for the published content exchanged between the publishing entities and subscribing entities;
   wherein the data hierarchy defines at least a child tier and a parent tier, where the child tier contains a plurality of published content contributed by a plurality of said publishing entities; and
   wherein the data hierarchy determines virtual connections formed between the plurality of network entities in response to publication and subscription requests exchanged between the entities, such that the virtual connections established between network entities form a hierarchy corresponding to the data hierarchy, whereby subscription by one of said subscribing entities to the parent tier of the data hierarchy results in the subscribing entity receiving all of said plurality of published content in the child tier; wherein the data hierarchy comprises a plurality of child-tiered data elements that each correspond to a portion of data that forms a parent-tiered data element; wherein different entities publish different ones of the child-tiered data elements; wherein responsive to a subscribing entity's subscription to the parent-tiered data element, the subscribing entity receives the plurality of child-tiered data elements via the virtual connections.

2. The messaging system of claim 1 wherein the published content of each publishing entity is contained in a document constructed using extensible markup language ("XML"), and wherein XML structural elements contained within said document defines said data hierarchy.

3. The messaging system of claim 1 wherein the plurality of network entities further includes guest entities operable to temporarily join the network to distribute data or perform queries.

4. The messaging system of claim 1 wherein the virtual connections formed between entities can be top-level connections, parent tier connections, or closest tier connections.

5. The messaging system of claim 4 wherein publish and subscribe operations must traverse the entire hierarchy of virtual connections.

6. The messaging system of claim 4 wherein data is passed through closest tier connections to bypass network entities in the hierarchy of virtual connections.

7. The messaging system of claim 1 wherein the network includes one or more sub-networks and the data hierarchy acts to constrain data to those portions of the network to which it has relevance.

8. The messaging system of claim 1 wherein each network entity has a data persistence setting.

9. The messaging system of claim 8 wherein the data persistence setting is selected from the group consisting of: full, caching and none.

10. A method for creating a messaging hierarchy among multiple network entities in a computer network, the method comprising:
  locating a parent tier entity by a first entity in the network upon joining the network;
  sending subscription information for the first entity to the parent tier entity, wherein said subscription information defines a desired scope of content to which the first entity subscribes; and
  determining whether the desired scope is encompassed by a scope of content to which the parent tier entity subscribes;
  when determined that the desired scope is encompassed by the scope of content to which the parent tier entity subscribes, not propagating the subscription information for the first entity further;
  when determined that the desired scope is not encompassed by the scope of content to which the parent tier entity subscribes, sending said subscription information from the parent tier entity to entities above the parent tier entity in the messaging hierarchy and to entities below the parent tier entity which provide at least a portion of data corresponding to said desired scope;
  wherein the messaging hierarchy is formed by virtual connections between the network entities in response to publication/subscription information exchanged between entities and corresponds to a data hierarchy defined for the messaging hierarchy, wherein information embedded within published content to which one or more entities subscribe defines said data hierarchy;
  wherein the multiple network entities act as publication entities, subscription entities and guest entities, wherein publication entities provide data to the messaging hierarchy, subscription entities receive data from publication entities, and guest entities are operable to temporarily join the network to distribute data or perform queries.

11. The method of claim 10 wherein each publishing entity in the messaging hierarchy publishes its content in a document constructed using extensible markup language ("XML"), and wherein XML structural elements contained within said document defines said data hierarchy.

12. The method of claim 10 wherein the virtual connections formed between entities can be top-level connections, parent tier connections, or closest tier connections.

13. The method of claim 12 wherein publish and subscribe operations must traverse the entire hierarchy of virtual connections.

14. The method of claim 12 wherein data is passed through closest tier connections to bypass network entities in the hierarchy of virtual connections.

15. The method of claim 10 wherein each network entity has a data persistence setting.

16. A method for subscription flow, the method comprising:
  receiving, by a network entity that comprises a device that is part of a messaging hierarchy in a computer network, subscription information from another entity in the network, wherein said subscription information defines a desired scope of published content to which said another entity subscribes;
  retaining, by the network entity, the subscription information and associated connection information;
  determining, by the network entity, whether the desired scope is encompassed by a scope of content to which the network entity subscribes;
  when determined that the desired scope is encompassed by the scope of content to which the network entity subscribes, not propagating the subscription information for the first entity further within the hierarchy;
  when determined that the desired scope is not encompassed by the scope of content to which the network entity subscribes, then:
    a) providing, by the network entity, the subscription information to a parent tier when the network entity is determined to have a parent tier; and
    b) as for lower tier entities that are on a same or lower tier of said hierarchy as said network entity, providing, by the network entity, the subscription information to only ones of the lower tier entities that provides at least a portion of published content that the subscription information indicates; and
  establishing virtual connections between entities in said computer network based on a data hierarchy for the messaging hierarchy, wherein information embedded within published content defines said data hierarchy, and wherein said published content is content published by one or more publishing entities in the computer network to which one or more subscribing entities subscribe.

17. The method of claim 16 wherein the network entity includes a data persistence setting.

18. The system of claim 1 wherein said plurality of network entities comprise devices that are communicatively coupled to the network.

19. The method of claim 10 wherein said network entities comprise devices that are communicatively coupled to the computer network.

20. The method of claim 19 wherein the data hierarchy defines a data hierarchy for data published by one or more publishing entities in the computer network.

21. The method of claim 16 wherein the receiving comprises:
  receiving, by the network entity, a subscription request from said another entity in the network requesting subscription to data published by said lower tier entity.

22. The system of claim 1 wherein said plurality of network entities comprise entities of a communication network monitoring system.

23. The system of claim 22 wherein said entities of a communication network monitoring system comprise components within at least one network monitoring probe.

24. The system of claim 22 wherein said content comprises at least one of:
  configuration information sent to the entities of the communication network monitoring system,
  data collected by the entities of the communication network monitoring system for monitoring the communications network,
  aggregations of data or statistics compiled by the entities of the communication network monitoring system, and
  control information for directing entities of the communication network monitoring system.

25. The system of claim 22 wherein said content comprises configuration information for configuring at least one of said entities of the communication network.

26. The system of claim 22 wherein said entities of the communication network monitoring system comprise at least one entity that communicates via a first communication protocol and at least one other entity that communicates via a second communication protocol that is different from said first communication protocol.

27. The system of claim 1 wherein said plurality of network entities comprise at least one entity that communicates via a first communication protocol and at least one other entity that communicates via a second communication protocol that is different from said first communication protocol.

28. The method of claim 10 wherein said multiple network entities comprise entities of a communication network monitoring system.

29. The method of claim 10 wherein said parent tier entity and said first entity comprise entities of a communication network monitoring system.

30. The method of claim 29 wherein said content comprises at least one of:
   configuration information sent to the entities of the communication network monitoring system,
   data collected by the entities of the communication network monitoring system for monitoring the communications network,
   aggregations of data or statistics compiled by the entities of the communication network monitoring system, and
   control information for directing entities of the communication network monitoring system.

31. The method of claim 10 wherein at least one of said parent tier entity, said first entity, said entities above the parent tier entity, and said entities below the parent tier entity comprise an entity of a communication network monitoring system.

32. The method of claim 31 wherein said entity of the communication network monitoring system comprises at least one network monitoring probe.

33. The method of claim 10 wherein said parent tier entity, said first entity, said entities above the parent tier entity, and said entities below the parent tier entity comprise: at least one entity that communicates via a first communication protocol and at least one other entity that communicates via a second communication protocol that is different from said first communication protocol.

34. The method of claim 16 wherein said network entity comprises an entity of a communication network monitoring system.

35. The method of claim 16 wherein said entities between which said virtual connections are established comprise entities of a communication network monitoring system.

36. The method of claim 35 wherein said content comprises at least one of:
   configuration information sent to the entities of the communication network monitoring system,
   data collected by the entities of the communication network monitoring system for monitoring the communications network,
   aggregations of data or statistics compiled by the entities of the communication network monitoring system, and
   control information for directing entities of the communication network monitoring system.

37. The method of claim 16 wherein said entities between which said virtual connections are established comprise: at least one entity that communicates via a first communication protocol and at least one other entity that communicates via a second communication protocol that is different from said first communication protocol.

38. The method of claim 10 wherein a plurality of publishing entities contribute to the desired scope of content to which the first entity subscribes.

39. The method of claim 16 wherein a plurality of publishing entities contribute published content that is encompassed by the desired scope of published content.

* * * * *